United States Patent
Clingerman et al.

(10) Patent No.: US 6,755,077 B2
(45) Date of Patent: Jun. 29, 2004

(54) DIAGNOSTIC SYSTEM FOR IDENTIFYING FUEL INJECTOR FAILURE IN A FUEL CELL SYSTEM

(75) Inventors: Bruce J. Clingerman, Palmyra, NY (US); Donald H. Keskula, Webster, NY (US); Julie A. Stuart, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/164,293

(22) Filed: Jun. 6, 2002

(65) Prior Publication Data

US 2003/0226399 A1 Dec. 11, 2003

(51) Int. Cl.[7] ............................................. G01M 15/00
(52) U.S. Cl. ........................................ 73/116; 73/119 A
(58) Field of Search .............................. 73/116, 117.2, 73/117.3, 118.1, 119 A, 119 R; 701/29; 180/65.1, 65.3; 123/198 D

(56) References Cited

U.S. PATENT DOCUMENTS

| | | | | |
|---|---|---|---|---|
| 4,932,246 A | * | 6/1990 | Deutsch et al. ............ | 73/119 A |
| 5,058,547 A | * | 10/1991 | Morikawa .................. | 73/119 A |
| 5,241,933 A | * | 9/1993 | Morikawa ................ | 123/198 D |
| 5,445,019 A | * | 8/1995 | Glidewell et al. ......... | 73/119 A |
| 5,493,902 A | * | 2/1996 | Glidewell et al. ......... | 73/119 A |
| 5,535,621 A | * | 7/1996 | Glidewell et al. ......... | 73/119 A |
| 6,293,251 B1 | * | 9/2001 | Hemmerlein et al. ...... | 73/119 A |
| 6,306,531 B1 | * | 10/2001 | Clingerman et al. ........... | 429/19 |
| 6,474,292 B1 | * | 11/2002 | Frenz et al. ............. | 123/198 D |
| 2002/0025460 A1 | * | 2/2002 | Horiguchi et al. ............ | 429/13 |
| 2002/0029770 A1 | * | 3/2002 | Heffel et al. ................ | 123/527 |
| 2002/0062943 A1 | * | 5/2002 | Kondo et al. ................ | 165/4 |
| 2002/0114988 A1 | * | 8/2002 | Iwasaki et al. ............... | 429/34 |
| 2002/0177017 A1 | * | 11/2002 | Nelson et al. ............... | 429/22 |
| 2003/0019363 A1 | * | 1/2003 | Grover et al. ................ | 96/189 |
| 2003/0024489 A1 | * | 2/2003 | Balan et al. ................ | 123/3 |
| 2003/0134166 A1 | * | 7/2003 | Skala et al. ................ | 429/17 |

* cited by examiner

*Primary Examiner*—Eric S. McCall
(74) *Attorney, Agent, or Firm*—Cary M. Brooks; Linda M. Deschere

(57) ABSTRACT

A diagnostic system and method identifies fuel injector failure in a fuel cell system including a fuel processor and a fuel source. A fuel injector supplies fuel from the fuel source to the fuel processor. A pressure sensor generates a pressure signal based on pressure between the fuel source and the fuel injector. A fuel injector diagnostic identifies fuel injector failure based on the pressure signal. The fuel injector diagnostic includes a moving window tracker that tracks the pressure signal over a moving window. The fuel injector diagnostic further includes a standard deviation or variance calculator that generates a standard deviation or variance based on the pressure signal in the moving window.

21 Claims, 5 Drawing Sheets

DIAGNOSTIC SYSTEM FOR IDENTIFYING FUEL INJECTOR FAILURE IN A FUEL CELL SYSTEM

FIELD OF THE INVENTION

The present invention relates to fuel injectors of fuel cells, and more particularly to a diagnostic system for identifying fuel injector failure in a fuel cell system.

BACKGROUND OF THE INVENTION

Pulsed fuel injectors are used to control the delivery of fuel in internal combustion engines of vehicles. Pulsed fuel injectors are also typically used with fuel cell systems that convert liquid fuel to a hydrogen-rich gas stream. Pulsed fuel injectors are proven, robust, and cost effective due to experience gained from their use in internal combustion engines.

Conventional methods for diagnosing degradation and failure of a fuel injector in internal combustion engines are inadequate for fuel cell applications. Diagnostic systems for internal combustion engines typically check for negative effects of a failed fuel injector. For example, a vehicle On Board Diagnostic (OBD) method monitors cylinder misfires. When an injector fails, the failed injector causes a momentary decrease in crankshaft speed. A position sensor detects the decrease and triggers a check engine light.

In internal combustion engines, an injector typically fails in a closed position, which does not harm the engine. A short term misbalance between fuel, air and spark does not typically impact engine durability. In a fuel cell fuel processor, however, the balance of inputs is more critical. A proper balance between fuel, air, and water keeps the fuel processor catalysts in proper working condition.

If the fuel injector fails while running, the fuel processor temperature begins changing. If the injector fails in the near closed position, temperature may rise due to a higher oxygen to carbon ratio (O/C). If the injector fails fully closed or open, temperature will eventually drop. Since the fuel processor has appreciable mass, the temperature drop may not occur quickly. During this time, water and air are reaching the fuel processor components without proper reactions taking place, which may harm the fuel processor components. Also, any change in temperature may be caused by other problems such as incorrect air or water. Therefore, monitoring temperature does not necessarily identify a failed injector.

If the fuel injector fails during startup, the system may run for several minutes before detection. Temperatures often takes a significant amount of time to rise in a cold fuel processor, even with a working fuel injector. A failed injector cannot be diagnosed based on temperature until long after the first fuel command. By this time, a significant amount of incorrect fuel has been supplied to the fuel processor.

Fuel flow sensors can be used to diagnose a failed injector. Fuel flow sensors are expensive and typically have moving parts that may fail. Fuel flow sensors add cost, size, and weight, reduce reliability and have wiring and controller I/O requirements.

SUMMARY OF THE INVENTION

A diagnostic system and method identifies fuel injector failure in a fuel cell system including a fuel processor and a fuel source. A fuel injector supplies fuel from the fuel source to the fuel processor. A pressure sensor generates a pressure signal based on pressure between the fuel source and the fuel injector. A fuel injector diagnostic identifies fuel injector failure based on the pressure signal.

In other features, a fuel pump pumps fuel from the fuel source to the fuel injector. A regulator communicates with the fuel tank and regulates pressure between the fuel pump and the fuel injector. The fuel injector diagnostic is implemented using a controller with a processor and memory.

In still other features, the fuel injector diagnostic includes a moving window tracker that tracks the pressure signal over a moving window. The fuel injector diagnostic further includes a standard deviation calculator that generates a standard deviation based on the pressure signal in the moving window. Alternately, the fuel injector diagnostic includes a variance calculator that generates a variance based on the pressure signal in the moving window.

In still other features, the fuel injector diagnostic includes a diagnostic enabler that enables the fuel injector diagnostic. The diagnostic enabler includes a comparator that receives an injector command and an injector command minimum signal. A noise reducer communicates with the comparator and transitions from low to high after a first period after the comparator signal goes high and from high to low after a second period after the comparator signal goes low.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
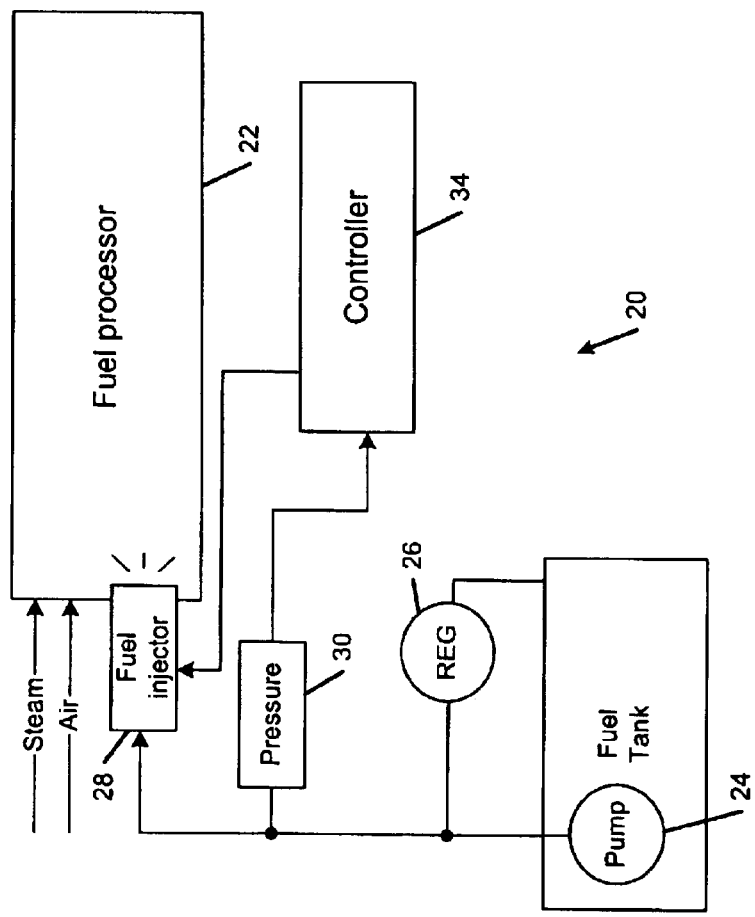
FIG. 1 is a functional block diagram of a fuel cell system including a fuel injector.

The following description of the preferred embodiment(s) is merely exemplary in nature and is in no way intended to limit the invention, its application, or uses. For purposes of clarity, the same reference numbers will be used in the drawings to identify similar elements.

In a fuel processor of a fuel cell, the balance of inputs is critical. Inputs typically include fuel, air, and water. If fuel stops flowing to the fuel processor, air and water pass through components of the fuel processor. Air can deactivate certain catalysts. The water may damage non-combusting fuel processors. Since fuel is not entering the fuel processor due to a failed injector, the water entering the fuel processor may be liquid water instead of steam. Liquid water that remains in components of the fuel processor after shutdown causes problems with catalysts. Liquid water also promotes corrosion, decreases durability, and causes restart problems at and below freezing temperatures. If too much fuel is flowing, resulting in a very low O/C and S/C, there is a possibility of forming carbon, which will damage the fuel processor and other downstream components (e.g. the fuel cell stack).

Referring now to FIG. 1, a fuel system 20 for a fuel processor 22 of a fuel cell includes a fuel pump 24, a fuel regulator 26, and a fuel injector 28. A fuel pressure sensor 30 generates pressure signals that are used by a controller 34 to diagnose a failed pump or regulator. If the pump 24 stops working or the regulator 26 fails in an open position, the controller 34 senses a pressure drop and takes appropriate action(s). The action(s) may include shutdown, turning on an indicator or other actions.

If the regulator 26 fails in a closed position, the pressure rises above a normal pressure and the controller 34 takes appropriate action. The fuel injectors 28 usually fail in an off or closed position. If this happens, the fuel pressure remains at the appropriate level. Prior methods to detect the failed injector 28 include sensing a temperature change in the fuel processor 22. If the fuel injector 28 fails during startup, prior methods detect a failure by waiting for light off of the fuel processor 22. In both of these cases, there is a significant amount of time when air and water enter the fuel processor 22 without fuel, which damages the fuel processor 22.

The present invention takes advantage of existing hardware to provide a timely and accurate diagnosis of fuel injector problems. The on/off control of the fuel injector 28 creates a pressure wave in the fuel system 20. The pressure wave occurs when the fuel injector 28 is opening and closing to inject fuel. The controller 34 that monitors the pressure sensor 30 (for fuel pump 24 or regulator 26 problems) can also monitor the pressure sensor for the pressure wave that is associated with an operating fuel injector. In one implementation, the controller 34 generates and monitors a standard deviation of the pressure signal over a small moving window of time. Other implementations monitor pressure variance. The controller 34 diagnoses the operation of the fuel injector 28 based on the standard deviation.

Figure 2:
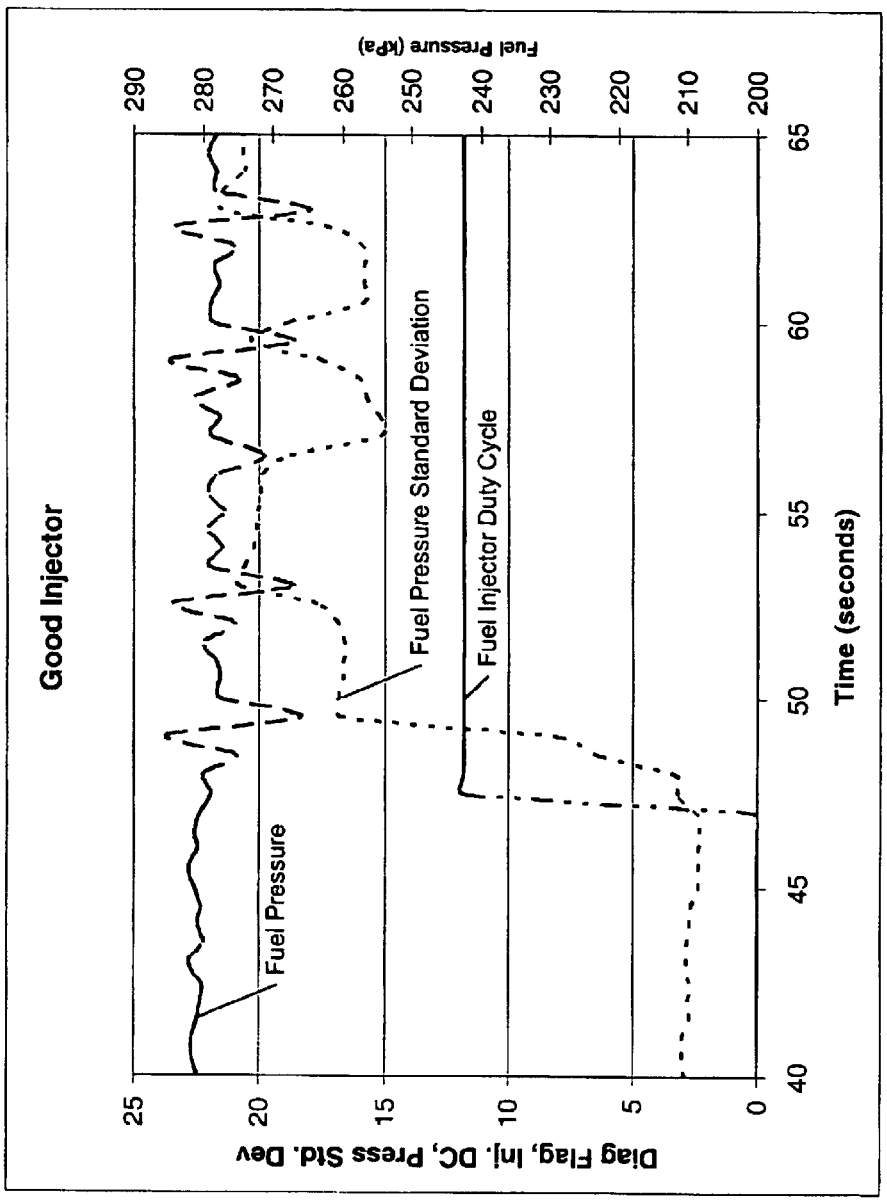
FIG. 2 is a graph illustrating the operation of an operating injector.

Referring now to FIG. 2, graphs illustrating an operating fuel injector are shown. The fuel line pressure is shown before and after the fuel injector 28 is operating. Note a significant increase in standard deviation when the fuel injector 28 is on. A pump "on" command leads a fuel injector "on" command by several seconds to build fuel pressure in the fuel system 20. A large standard deviation occurs when the pump is first turned on. The fuel injector diagnostic is preferably enabled after the fuel injector 28 is commanded on. Since the fuel injector diagnostic is not enabled when the pump and fuel injector are off, the low standard deviation is ignored.

Figure 3:
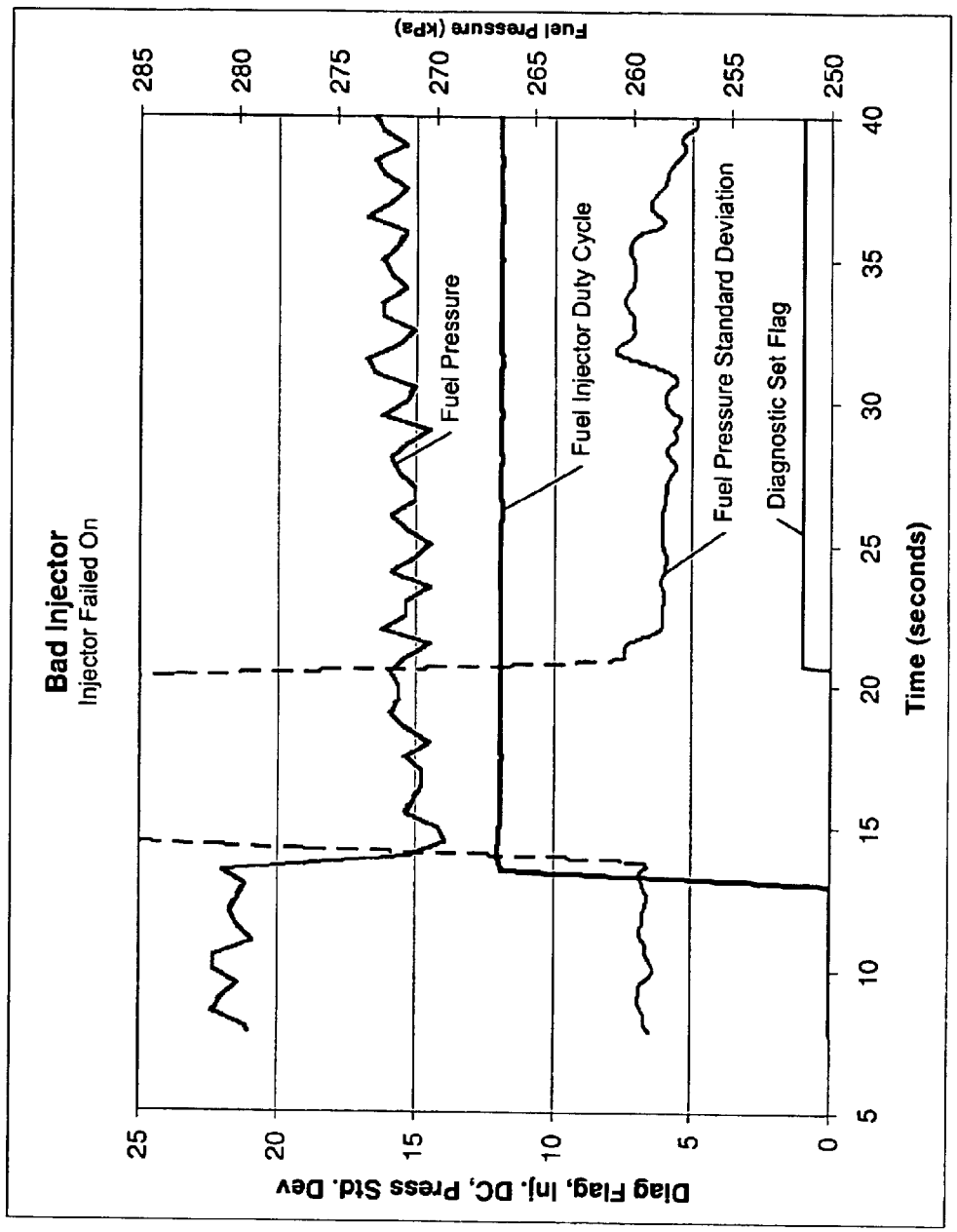
FIG. 3 is a graph illustrating the operation of an injector that failed in the full on condition.

Referring now to FIG. 3, graphs illustrating a failed fuel injector are shown. When the standard deviation falls below a first threshold such as 15, a warning light is turned on. When the standard deviation falls below a second threshold such as 10, the fuel cell is shut down.

The fuel system 20 is preferably calibrated to determine the pressure characteristics of an operating fuel injector. The calibration is specific to the system hardware such as pump dynamics, regulator dynamics, injection rate frequencies, and operating pressures. Once the fuel system 20 is well understood, the pressure measurement and statistical analysis determine degradation of the fuel injector. This allows advanced warning of a failing fuel injector before the problem forces a shutdown. Therefore, the first and second standard deviation thresholds that identify warning and shutdown will vary. It is also possible, with other control and mathematical techniques, to dynamically determine the characteristics of the fuel system so that changes in the system over time, as well as variations due to production tolerances, and other effects can be accounted for.

Figure 4:
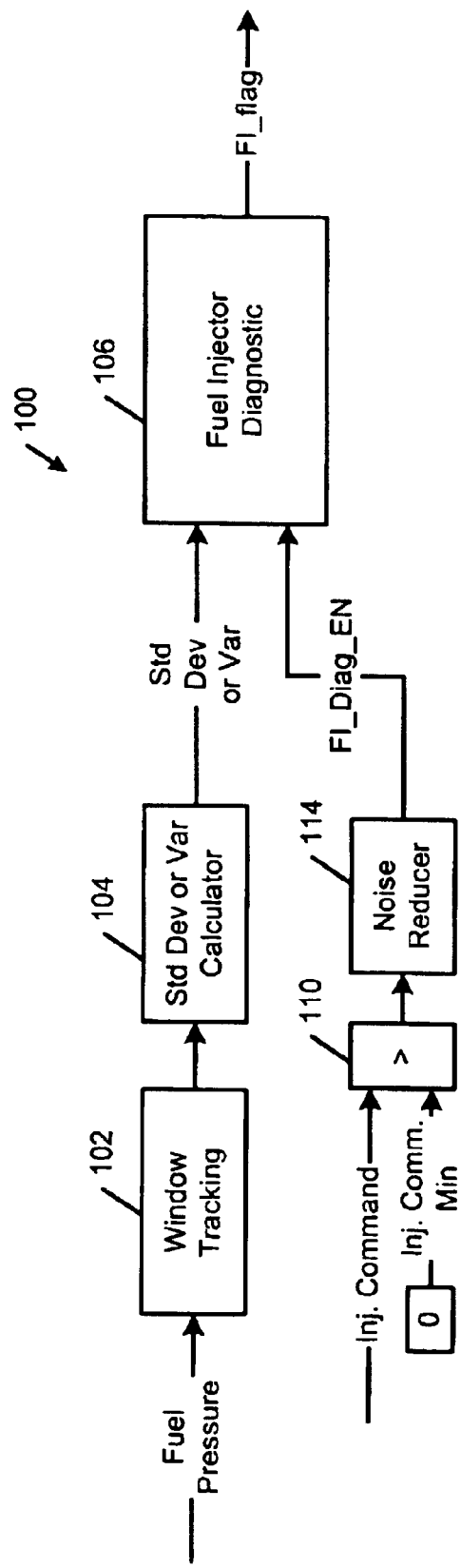
FIG. 4 is a functional block diagram of a diagnostic system for a fuel injector of a fuel cell system.

Referring now to FIG. 4, an exemplary implementation of the fuel injector diagnostic is shown generally at 100. The fuel pressure signal from the pressure sensor is input to a fuel pressure window 102. The fuel pressure window can be implemented using a circuit, an algorithm executed by a controller or in any other suitable manner. An output of the fuel pressure window 102 is input to a standard deviation or variance calculator 104, which outputs a fuel pressure standard deviation or variance to a fuel injector diagnostic 106. An injector command is input to a comparator 110. Another input of the comparator 110 is coupled to an injector command minimum, which is preferably set equal to 0.

An output of the comparator 110 is input to a noise reducer 114. The noise reducer can be implemented using a double debounce circuit or algorithm that changes state from low to high after the signal is high for a first period. The noise reducer 114 changes from high to low after the signal is low for a second period. The noise reducer 114 reduces effects of noise and outputs a fuel injector diagnostic enable signal to the fuel injector diagnostic 106. Based on the input signals, the fuel injector diagnostic 106 sets a fuel injector flag or takes other action if a fault is detected. For example, the fuel injector diagnostic 106 turns on the warning light when the standard deviation is below 15 and shuts down the fuel cell when the standard deviation is below 10. As can be appreciated, other mathematical methods of determining injector performance, such as variance, may be used. The present invention also works with water injection systems as well.

Figure 5:
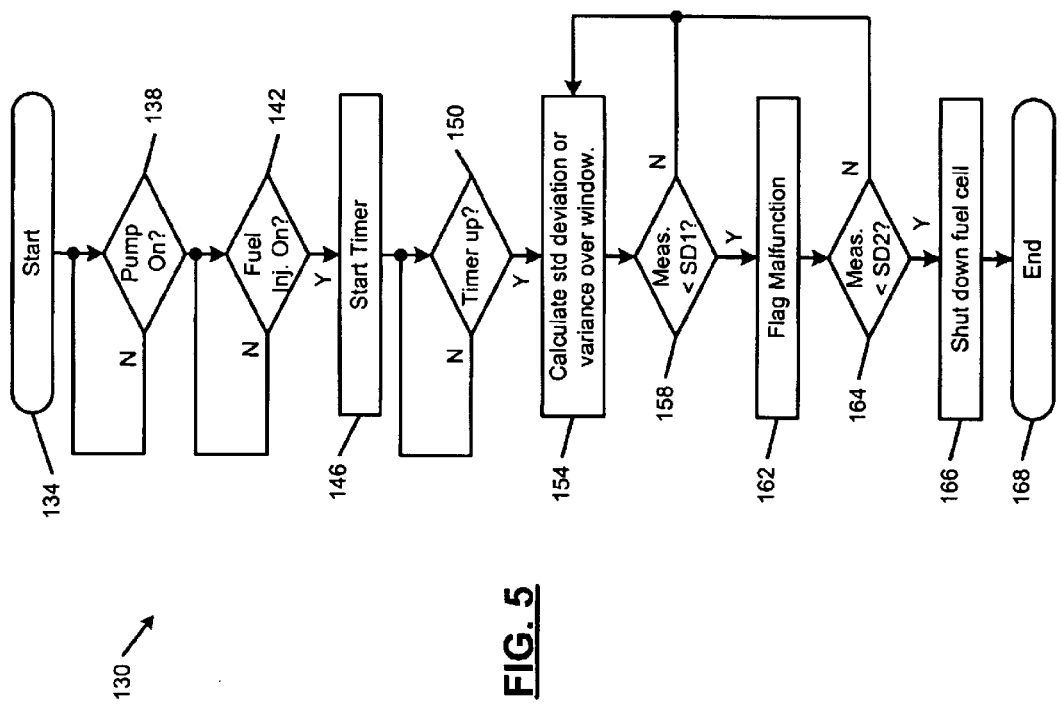
FIG. 5 is a flowchart illustrating steps performed by the controller.

Referring now to FIG. 5, exemplary steps for operating the controller 34 are shown generally at 130. Control begins with step 134. In step 138, the controller 34 determines whether the pump 24 is on. If not, control loops back to step 138. Otherwise, control continues with step 142 where the controller 34 determines whether the fuel injector 28 is turned on. If not, control loops back to step 142. Otherwise, control continues with step 146 and starts a timer.

In step 150, the controller 34 determines whether the timer is up. If not, control loops back to step 150. Otherwise, control continues with step 154 and calculates pressure standard deviation or variance over a time window. In step 158, control determines whether the calculated measurement is less than a first threshold SD1 (such as a first standard deviation or variance). If not, control loops back to step 154. Otherwise, control flags a malfunction in step 162. In step 164, the controller 34 determines whether the measurement is less than a second threshold SD2 (such as a second standard deviation or variance). If true, the controller 34 shuts down the fuel cell in step 166 and control ends in step 168. If false, the controller 34 loops back to step 154.

The fuel injector diagnostic system according to the present invention identifies a failed injector before the injector damages the fuel processor. Injector degradation is detected and the controller warns the operator before forcing a shutdown. When the fuel injector fails, the root cause is diagnosed, which reduces the cost of repairs.

Those skilled in the art can now appreciate from the foregoing description that the broad teachings of the present invention can be implemented in a variety of forms.

Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel cell system comprising a diagnostic system for identifying fuel injector failure in said fuel cell system, comprising:

a fuel processor for producing hydrogen;

a fuel source;

a fuel injector that supplies fuel from said fuel source to said fuel processor;

a pressure sensor that generates a pressure signal based on pressure between said fuel source and said fuel injector; and a fuel injector diagnostic that identifies fuel injector failure based on said pressure signal.

2. The system of claim 1 further comprising:

a fuel pump that pumps fuel from said fuel source to said fuel injector.

3. The system of claim 2 further comprising:

a regulator that communicates with said fuel source and that regulates pressure between said fuel pump and said fuel injector.

4. The system of claim 1 wherein said fuel injector diagnostic is implemented using a controller with a processor and memory.

5. The system of claim 1 wherein said fuel injector diagnostic includes a moving window tracker that tracks said pressure signal over a moving window.

6. The system of claim 5 wherein said fuel injector diagnostic further includes a standard deviation calculator that generates a standard deviation based on said pressure signal in said moving window, wherein when said standard deviation is less than a first threshold, said fuel injector diagnostic turns on an indicator and when said standard deviation is less than a second threshold, said fuel injector diagnostic shuts down said fuel cell.

7. The system of claim 5 wherein said fuel injector diagnostic further includes a variance calculator that generates a variance based on said pressure signal in said moving window and wherein when said variance is less than a first threshold, said fuel injector diagnostic turns on an indicator and when said variance is less than a second threshold, said fuel injector diagnostic shuts down said fuel cell.

8. The system of claim 5 wherein said fuel injector diagnostic further includes a diagnostic enabler that enables said fuel injector diagnostic.

9. The system of claim 8 wherein said diagnostic enabler includes a comparator that receives an injector command and an injector command minimum signal.

10. The diagnostic system of claim 9 further comprising a noise reducer that communicates with said comparator and that transitions from low to high after a first period after said comparator signal goes high and from high to low after a second period after said comparator signal goes low.

11. A method for diagnosing fuel injector failure in a fuel cell system, said fuel cell system comprising a fuel source and a fuel processor for producing hydrogen, said method comprising:

supplies fuel from said fuel source to said fuel processor using a fuel injector;

generating a pressure signal based on pressure between said fuel source and said fuel injector; and identifying fuel injector failure based on said pressure signal.

12. The method of claim 11 further comprising pumping fuel from said fuel source to said fuel injector.

13. The method of claim 12 further comprising regulating pressure between said fuel pump and said fuel injector.

14. The method of claim 11 wherein said fuel injector diagnostic is implemented using a controller with a processor and memory.

15. The method of claim 11 further comprising tracking said pressure signal over a moving window.

16. The method of claim 15 further comprising generating a standard deviation based on said pressure signal in said moving window.

17. The method of claim 16 further comprising:

comparing said standard deviation to a first threshold; and turning on an indicator light if said standard deviation exceeds said first threshold.

18. The method of claim 17 further comprising:

comparing said standard deviation to a second threshold; and shutting down said fuel injector if said standard deviation exceeds said second threshold.

19. The method of claim 15 further comprising generating a variance based on said pressure signal in said moving window.

20. The method of claim 19 further comprising:

comparing said variance to a first threshold; and turning on an indicator light if said variance exceeds said first threshold.

21. The method of claim 20 further comprising:

comparing said variance to a second threshold; and shutting down said fuel injector if said variance exceeds said second threshold.

* * * * *